US011155159B2

(12) United States Patent
Okabayashi

(10) Patent No.: US 11,155,159 B2
(45) Date of Patent: Oct. 26, 2021

(54) FUEL TANK VALVE APPARATUS

(71) Applicant: NIFCO INC., Yokosuka (JP)

(72) Inventor: Shunsuke Okabayashi, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 17/012,760

(22) Filed: Sep. 4, 2020

(65) Prior Publication Data

US 2021/0107352 A1    Apr. 15, 2021

(30) Foreign Application Priority Data

Oct. 10, 2019   (JP) .............................. JP2019-187102

(51) Int. Cl.
| | |
|---|---|
| *B60K 15/035* | (2006.01) |
| *F16K 24/04* | (2006.01) |
| *B60K 15/03* | (2006.01) |
| *F16K 17/36* | (2006.01) |

(52) U.S. Cl.
CPC ...... *B60K 15/03519* (2013.01); *F16K 24/044* (2013.01); *B60K 2015/03289* (2013.01); *B60K 2015/03447* (2013.01); *F16K 17/36* (2013.01)

(58) Field of Classification Search
CPC .... B60K 15/03519; B60K 2015/03289; B60K 2015/03447; F16K 24/044; F16K 17/36
See application file for complete search history.

(56) References Cited

U.S. PATENT DOCUMENTS

| | | | |
|---|---|---|---|
| 5,738,132 A | 4/1998 | Zakai et al. | |
| 6,405,747 B1 * | 6/2002 | King ................. | B60K 15/03519 |
| | | | 137/202 |
| 10,059,196 B2 * | 8/2018 | Walkowski .......... | B60K 15/035 |
| 2007/0000542 A1 * | 1/2007 | Johansen .............. | F16K 24/044 |
| | | | 137/202 |
| 2009/0199908 A1 * | 8/2009 | Arnalsteen ............ | F16K 24/044 |
| | | | 137/202 |
| 2010/0108155 A1 * | 5/2010 | Kobayashi ....... | B60K 15/03519 |
| | | | 137/202 |
| 2015/0144204 A1 * | 5/2015 | Walkowski ........... | F16K 24/044 |
| | | | 137/202 |
| 2017/0175912 A1 * | 6/2017 | Wada ................. | F02M 25/0836 |

FOREIGN PATENT DOCUMENTS

JP         H08-254278 A    10/1996

* cited by examiner

*Primary Examiner* — Jessica Cahill
*Assistant Examiner* — Patrick C Williams
(74) *Attorney, Agent, or Firm* — Manabu Kanesaka

(57) ABSTRACT

A fuel tank valve apparatus includes a valve port configured to allow inside and outside of a fuel tank to communicate with each other, a valve chamber formed under the valve port, a float body disposed movably up and down inside the valve chamber, and a seal member having elasticity with respect to the valve port and mounted on an upper portion of the float body. The seal member includes a main body configured to close the valve port, a combining portion with respect to the upper portion of the float body, and an extending portion laterally extending from the main body. The float body includes a combined portion combined with the combining portion with up-and-down movements of the seal member allowed in a predetermined range, and a hook portion located above the extending portion.

6 Claims, 9 Drawing Sheets

FUEL TANK VALVE APPARATUS

BACKGROUND OF THE INVENTION

Technical Field

The present invention relates to an improvement in a fuel tank valve apparatus that is attached to a fuel tank of a motor vehicle or a two-wheel vehicle to constitute a part of a vent passage of the fuel tank and configured to allow the inside and the outside of the fuel tank to communicate with each other in a valve-open state.

Related Art

JP H8-254278 A discloses a vent valve that includes a float member housed inside a housing including a fluid inlet and a fluid outlet. The float member is seated, at a raised position, on a valve seat configured to limit the fluid outlet.

The vent valve of JP H8-254278 A includes a soft closing film piece. The soft closing film piece is fixed to an upper portion of the float member and seated on the valve seat. When the float member becomes movable downward by gravity after seating, a vent outlet is gradually opened by deformation of the soft closing film piece.

SUMMARY OF THE INVENTION

It is a principal object of the present invention to facilitate assembly between a float body and a seal member that is mounted on an upper portion of the float body and configured to close a valve port when the float body is located at a maximum raised position in this kind of valve apparatus and efficiently provide a structure capable of pulling the seal member off the valve port when the float body becomes movable downward from a state in which the valve port is closed in the valve apparatus.

In order to achieve the above object, an aspect of the present invention provides a fuel tank valve apparatus including: a valve port configured to allow inside and outside of a fuel tank to communicate with each other; a valve chamber formed under the valve port; a float body disposed movably up and down inside the valve chamber; and a seal member having rubber-like elasticity, the seal member being mounted on an upper portion of the float body and configured to close the valve port. The seal member include a main body to close the valve port, a combining portion with respect to the upper portion of the float body, and an extending portion laterally extending from the main body. The float body includes a combined portion combined with the combining portion with up-and-down movements of the seal member allowed in a certain range, and a hook portion located above the extending portion.

According to such a configuration, the seal member having rubber-like elasticity can be easily and appropriately mounted on the upper portion of the float body by combining the combined portion with the combining portion with the extending portion inserted under the hook portion.

When the float body is raised to the maximum raised position by a fuel flowing into the valve chamber, the seal member can close the valve port, thereby preventing the fuel from flowing out through the valve port (a valve-closed state). When the fuel flows out of the valve chamber after closing the valve port, the float body becomes movable downward by its own weight. However, when the pressure inside the fuel tank is high, a phenomenon in which the seal member is stuck to the valve port occurs. In the above aspect of the present invention, the seal member is combined with the float body movably up and down in the certain range, and the extending portion is located under the hook portion. Thus, at this time, the float body can cause a force for pulling the seal member off the valve port to effectively act on the seal member through the hook portion from the side of the extending portion. Accordingly, even when such a phenomenon occurs, it is possible to release the intimate contact between the seal member and the valve port to promptly lower the float body, thereby ensuring a ventilation state between the inside and the outside of the fuel tank.

According to another aspect of the present invention, the combining portion includes a projection piece projecting downward from the main body and including an engagement projection formed on a projecting end of the projection piece, and the combined portion includes an engagement hole formed on the float body, the engagement portion being configured to receive the projection piece by elastic deformation of the seal member and including a hole edge hooked on the engagement projection of the projection piece with the up-and-down movements of the seal member allowed in the certain range by elastic return of the seal member at a reception end position.

Further, according to a further aspect of the present invention, the hook portion is laid between a pair of support portions projecting upward from the upper portion of the float body.

Further, according to a still further aspect of the present invention, the fuel tank valve apparatus further includes a positioning portion formed between the pair of support portions and inserted into a dividing groove of the seal member, the dividing groove extending from a projecting end of the extending portion of the seal member toward the main body.

Further, according to a still further aspect of the present invention, the seal member includes a projection formed on a center of a lower face of the main body and mounted on the upper portion of the float body.

The present invention makes it possible to facilitate assembly between a float body and a seal member that is mounted on an upper portion of the float body and configured to close a valve port when the float body is located at a maximum raised position in this kind of valve apparatus. Further, it is possible to efficiently pull the seal member off the valve port when the float body becomes movable downward from a state in which the valve port is closed.

DETAILED DESCRIPTION

Figure 1:
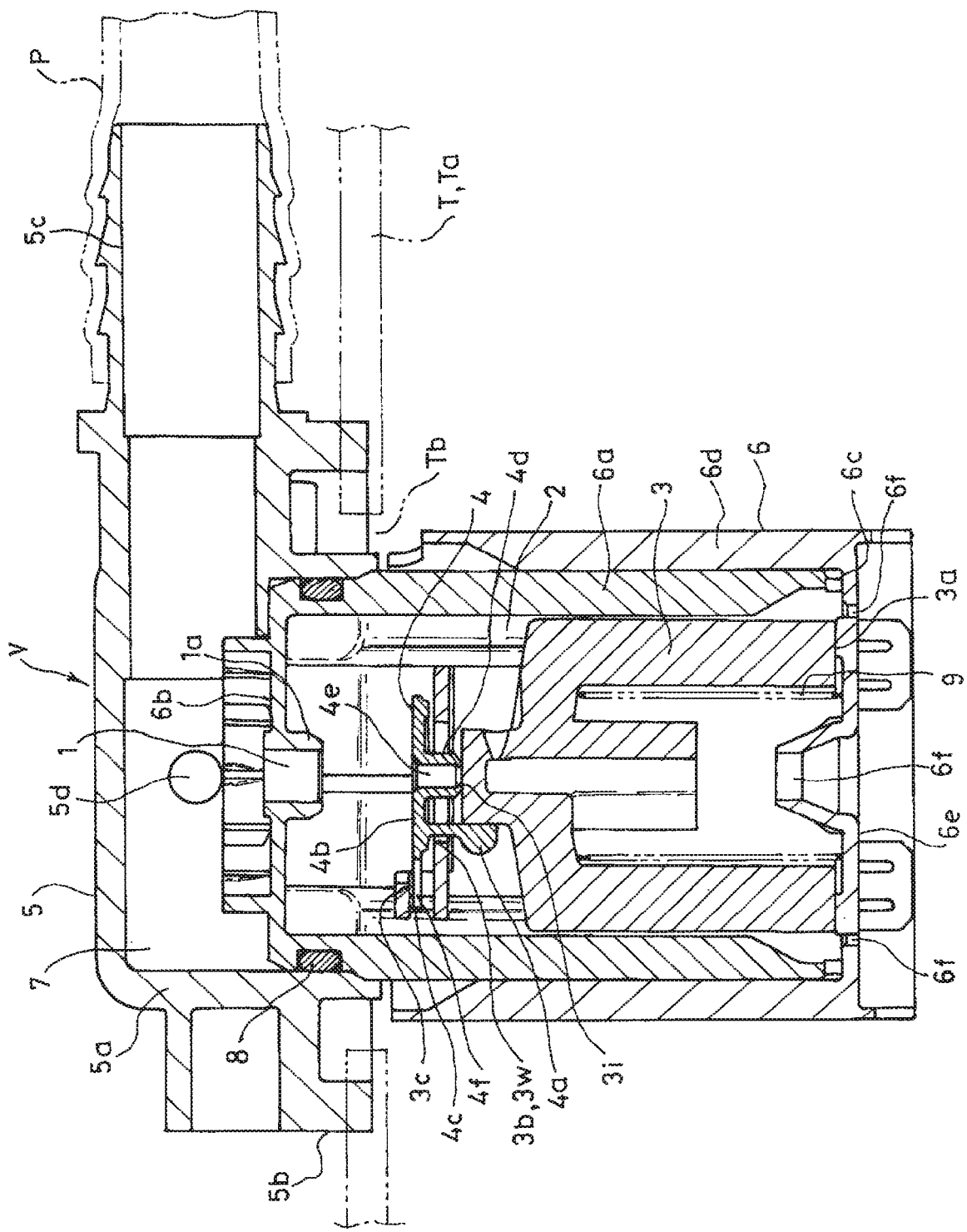
FIG. 1 is a sectional view of a valve apparatus according to an embodiment of the present invention, the valve apparatus being in a valve-open state.

Hereinbelow, a typical embodiment of the present invention will be described with reference to FIGS. 1 to 9. A valve apparatus V according to the embodiment is attached to a fuel tank T of a motor vehicle or a two-wheel vehicle to constitute a part of a vent passage of the fuel tank T and configured to allow the inside and the outside of the fuel tank T to communicate with each other in a valve-open state. The valve apparatus V is typically attached to an upper portion Ta of the fuel tank T to constitute a part of the vent passage of the fuel tank T. The valve apparatus V can be attached to the fuel tank T by using an attachment hole Tb disposed on the fuel tank T as illustrated or, although not illustrated, by using a bracket disposed inside the fuel tank T.

The valve apparatus V includes at least:

(1) a valve port 1 which allows the inside and the outside of the fuel tank Tb to communicate with each other;

(2) a valve chamber 2 which is formed under the valve port 1;

(3) a float body 3 which is disposed movably up and down inside the valve chamber 2 and configured to close the valve port 1 with a seal member 4 (described below) at a maximum raised position; and (4) the seal member 4 having rubber-like elasticity as a valve disc which is mounted on an upper portion 3f of the float body 3 and configured to close the valve port 1.

In the illustrated example, the valve apparatus V includes an upper structure 5 and a valve chamber structure 6 which are combined with each other. Each of the upper structure 5, the valve chamber structure 6, and the float body 3 typically includes a rigid plastic molded article.

The upper structure 5 includes a short tubular portion 5a having a closed upper end and an open lower end, a flange 5b which is formed on the lower end of the short tubular portion 5a, and first and second connection pipes 5c, 5d each of which has one end connected to the side part of the short tubular portion 5a and laterally extends above the flange 5b. In the illustrated example, the valve apparatus V is attached to the fuel tank T by inserting the flange 5b into the attachment hole Tb and fixing the flange 5b to the outer face part of the fuel tank T. The inside and the outside of the upper structure 5, that is, the inside and the outside of the fuel tank Tb communicate with each other through a vent pipe P illustrated in FIG. 1 which is attached to the first and second connection pipes 5c, 5d.

The valve chamber structure 6 includes an inner tube body 6a which includes the valve port 1 on the upper end thereof and has an open lower end, and an exterior body 6d which is combined with the inner tube body 6a and includes a bottom portion 6e which constitutes the bottom of the valve chamber 2.

The outer diameter of the inner tube body 6a is substantially equal to the inner diameter of the short tubular portion 5a of the upper structure 5. The upper structure 5 and the valve chamber structure 6 are combined with each other by inserting the upper portion of the inner tube body 6a into the short tubular portion 5a of the upper structure 5 from the lower end side thereof in such manner that an upper space 7 is formed between a top face 6b of the inner tube body 6a and the upper end of the upper structure 5. A seal ring 8 illustrated in FIG. 1 ensures an airtight state between the upper structure 5 and the valve chamber structure 6.

The exterior body 6d has a tubular shape having an open upper end and a lower end which is substantially closed with the bottom portion 6e, which constitutes the bottom of the valve chamber 2, with fuel passage portions 6f formed at a several positions. The inner diameter of the exterior body 6d is substantially equal to the outer diameter of the inner tube body 6a.

The valve chamber 2 in which the float body 3 is housed movably up and down is constructed by inserting, from a lower end 6c, the inner tube body 6a in a state where the float body 3 and a spring 9 (described below) are housed into the inner tube body 6a from the upper end of the exterior body 6d, into the exterior body 6d until the lower end 6c of the inner tube body 6a comes into contact with the bottom portion 6e of the exterior body 6d.

Figure 2:
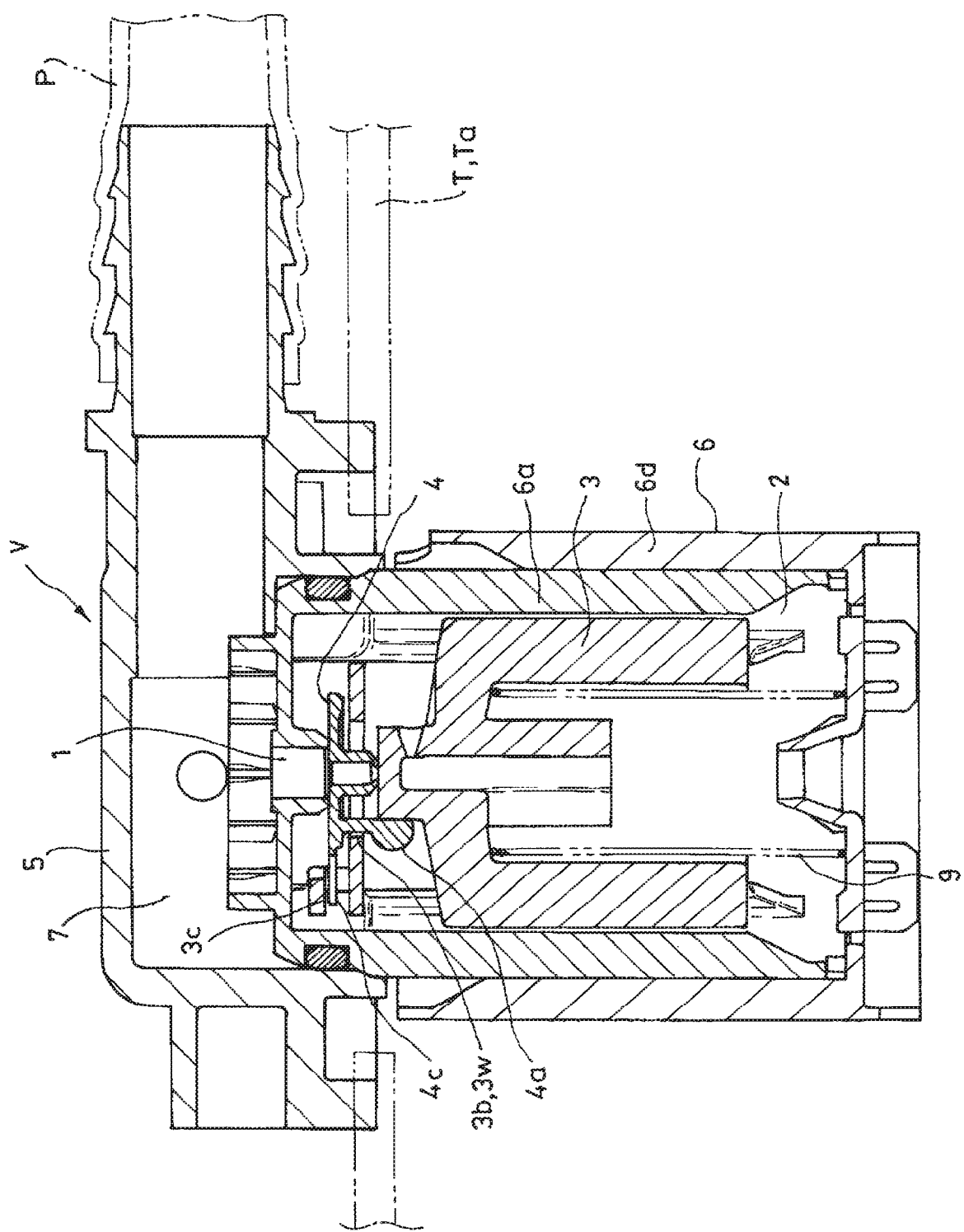
FIG. 2 is a sectional view of the valve apparatus in a valve-closed state.

The valve port 1 is formed on the center of the upper end of the inner tube body 6a. The valve port 1 is surrounded by a circumferential projection 1a at the valve chamber 2 side. When the float body 3 is located at the maximum raised position, the seal member 4 is seated on the circumferential projection 1a as a valve seat to close the valve port 1 (FIG. 2). On the other hand, when the float body 3 is located at a maximum lowered position where a lower end 3a of the float body 3 is in contact with the bottom portion 6e of the exterior body 6d, a vent passage between the fuel tank Tb and the outside is formed by the fuel passage portions 6f, the valve chamber 2, the valve port 1, the upper space 7, and the first and second connection pipes 5c, 5d.

In the illustrated example, the float body 3 has a hollow cylindrical shape having a closed upper end and the lower end 3a which is open. The float body 3 includes a combined portion 3b which is combined with a combining portion 4a of the seal member 4 (described below) with up-and-down movements of the seal member 4 allowed in a certain range, and a hook portion 3c which is located above an extending portion 4c (described below).

In the illustrated example, a groove-like recess 3g is formed on the upper portion 3f of the float body 3. The groove-like recess 3g includes groove walls 3h which are substantially parallel to a virtual straight line x (refer to FIG. 7) passing through the center of the upper portion 3f.

A base 3i is formed inside the groove-like recess 3g. The base 3i has a short columnar shape and projects from the center of the upper portion 3f of the float body 3. An upper face 3j of the base 3i is located below an upper face 3k of the float body 3, the upper face 3k being located outside the groove-like recess 3g.

Further, a pair of standing walls 3m is formed inside the groove-like recess 3g. A slit 3n which is parallel to the virtual straight line x is formed between each of the standing walls 3m and the corresponding groove wall 3h. The base 3i is located between the standing walls 3m. A top plate 3o is laid between the upper ends of the standing walls 3m. The top plate 3o has a rectangular contour shape having long sides 3p extending along the virtual straight line x and first and second short sides 3q perpendicular to the virtual straight line x. An upper face 3r of the top plate 3o is flush with the upper face 3k of the float body 3 and located above the upper face 3j of the base 3i. The top plate 3o includes a window hole 3s through which the entire upper face 3j of the base 3i is exposed upward.

The window hole 3s includes a circular hole portion 3t having a shape corresponding to the contour shape of the upper face 3j of the base 3i, and an additional hole portion 3u which is formed between the circular hole portion 3t and the first short side 3q of the top plate 3o. The additional hole portion 3u communicates with the circular hole portion 3t at the central side of the upper portion 3f of the float body 3 and includes a hole edge 3v which is located opposite to the communicating side and perpendicular to the virtual straight line x. In the illustrated example, an engagement hole 3w is defined between the hole edge 3v of the additional hole portion 3u, the hole edge 3v being located opposite to the communicating side, and the base 3i. The engagement hole 3w receives the combining portion 4a of the seal member 4 (described below). Further, an engagement projection 4h of the combining portion 4a is hooked on the hole edge 3v of the additional hole portion 3u, the hole edge 3v being located opposite to the communicating side. That is, in the illustrated example, the hole edge 3v of the additional hole portion 3u, the hole edge 3v being located opposite to the communicating side, and the base 3i constitute the combined portion 3b. More specifically, the combined portion 3b is the engagement hole 3w formed on the float body 3. The engagement hole 3w receives a projection piece 4g (described below) of the combining portion 4a by elastic deformation of the seal member 4 and includes a hole edge which is hooked on the engagement projection 4h of the projection piece 4g with up-and-down movements of the seal member 4 allowed in the certain range by elastic return of the seal member 4 at a reception end position.

Figure 7:
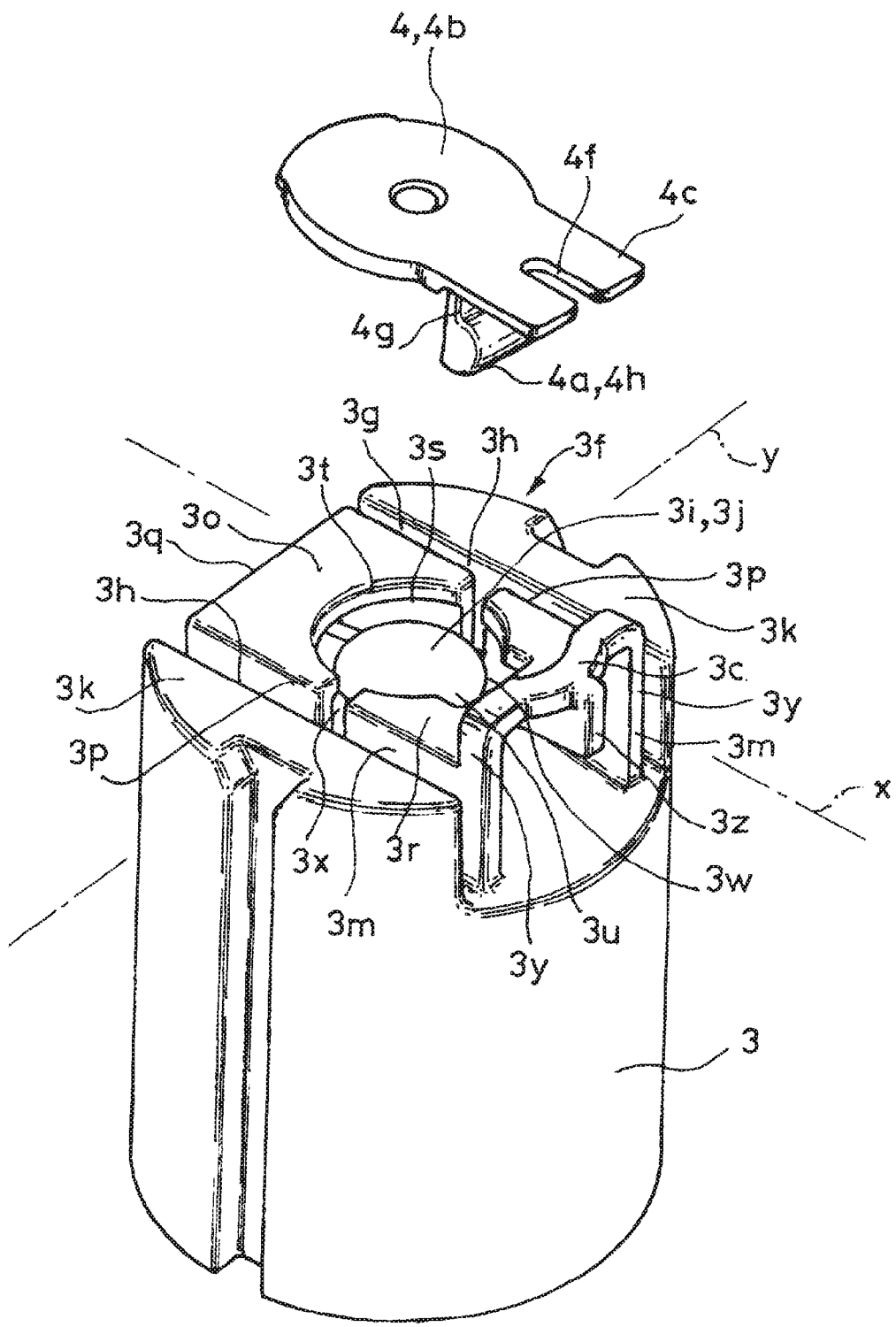
FIG. 7 is a perspective view separately illustrating the float body and a seal member.
Figure 8:
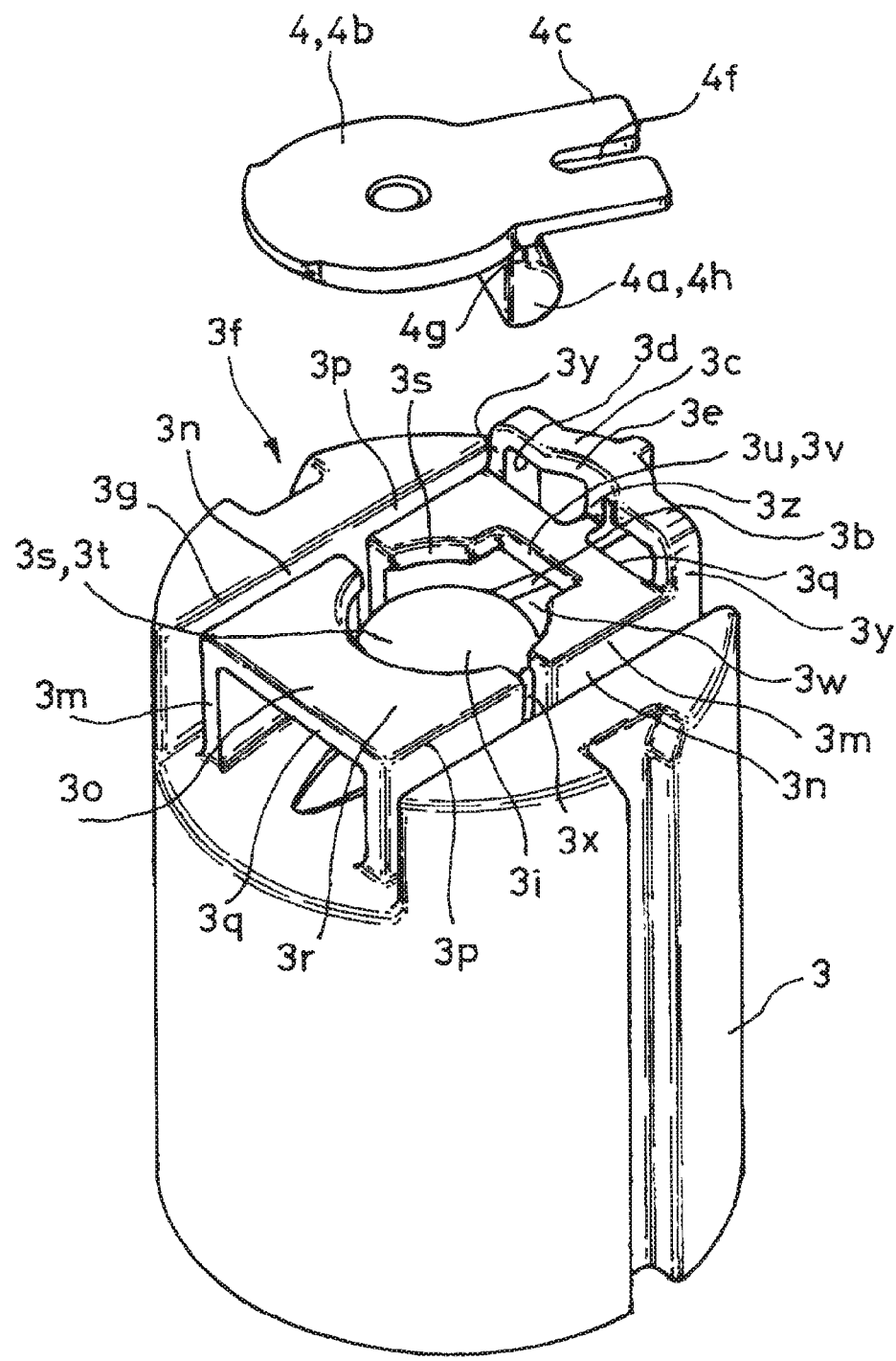
FIG. 8 is a perspective view separately illustrating the float body and the seal member.
Figure 9:
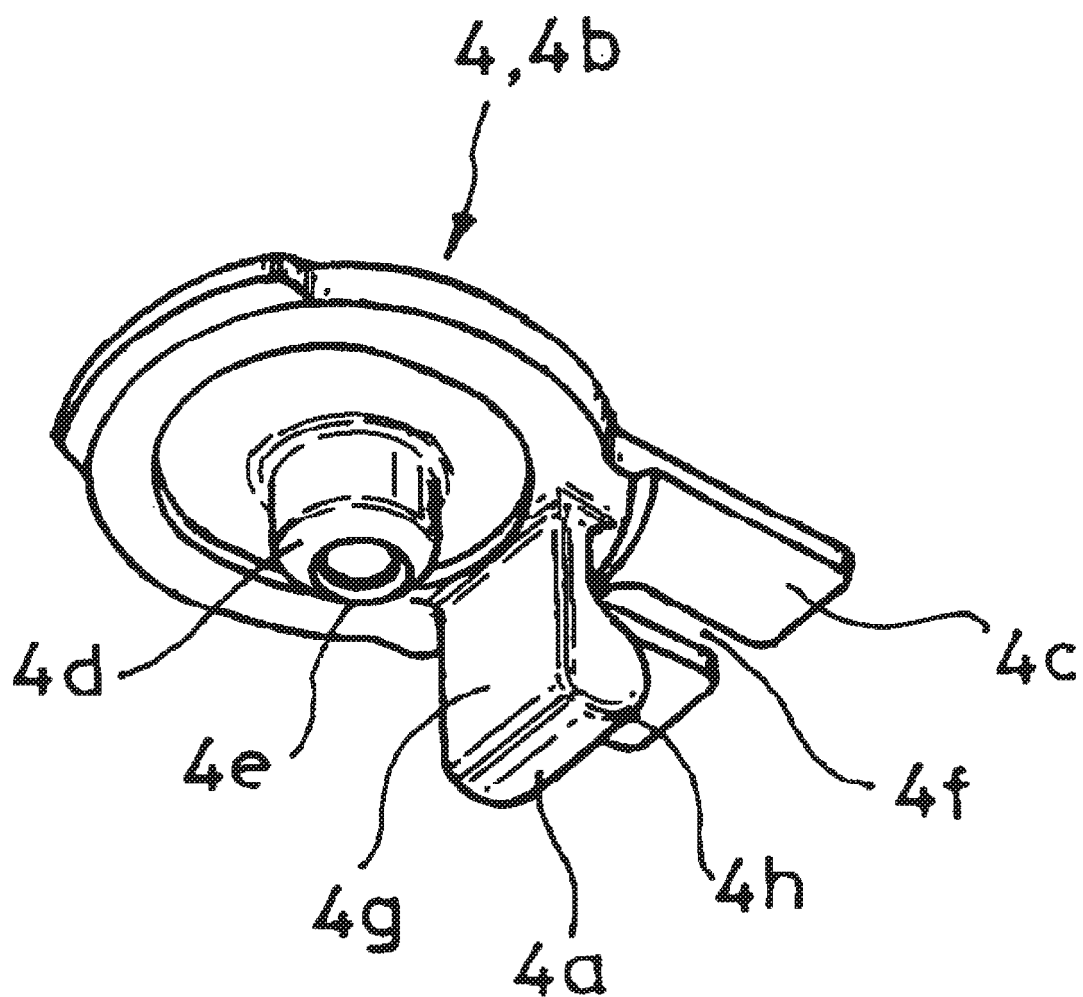
FIG. 9 is a perspective view of the seal member.

Note that, in the illustrated example, the pair of standing walls 3m and the top plate 3o are divided to the right side and the left side of FIG. 7 by a dividing groove 3x at a position along a virtual straight line y (refer to FIG. 7) which is perpendicular to the virtual straight line x at the center of the upper portion 3f of the float body 3.

In the present embodiment, the hook portion 3c is formed between the first short side 3q of the top plate 3o and one end of the groove-like recess 3g located at the side corresponding to the first short side 3q.

In the illustrated example, the hook portion 3c is laid between a pair of support portions 3y which is integrated with the pair of standing walls 3m and projects upward. The pair of support portions 3y and the hook portion 3c form a portal structure inside the groove-like recess 3g. The hook portion 3c is formed along the groove width of the groove-like recess 3g. A lower face 3d of the hook portion 3c is located above the upper face 3r of the top plate 3o. An edge of the hook portion 3c, the edge being located at the window hole 3s side, is located immediately above the first short side 3q.

In the illustrated example, the hook portion 3c includes an intermediate support portion 3z at an intermediate position in the length direction, that is, the groove-width direction of the groove-like recess 3g. The intermediate support portion 3z is connected to the first short side 3q of the top plate 3o. A reception space for receiving the extending portion 4c of the seal member 4 (described below), the reception space being defined by the pair of support portions 3y and the hook portion 3c, is divided into two parts by the intermediate support portion 3z. In the illustrated example, the hook portion 3c is curved at the position connected with the intermediate support portion 3z in such a manner that the inner side of the curve corresponds to the window hole 3s side.

As illustrated in FIG. 1, a compression coil spring 9 is housed inside the float body 3. An upper end of the compression coil spring 9 is in contact with the float body 3, and a lower end thereof is in contact with the bottom portion 6e of the exterior body 6d. A certain upward biasing force acts on the float body 3 by the compression coil spring 9.

On the other hand, the seal member 4 includes a main body 4b which is capable of closing the valve port 1, the combining portion 4a which is combined with the upper portion 3f of the float body 3, and the extending portion 4c which laterally projects from the main body 4b. The seal member 4 is typically made of rubber or a plastic elastomer.

The main body 4b has a size that enables the main body 4b to close the valve port 1 by coming into contact with the circular valve seat of the circumferential projection 1a which surrounds the valve port 1 when the float body 3 is located at the maximum raised position. In the illustrated example, the main body 4b is configured as a plate-like body having a contour shape along an arc of a virtual circle.

The main body 4b includes a projection 4d which projects downward from the center of the lower face thereof. The seal member 4 is mounted on the float body 3 in such a manner that the projection 4d formed on the center of the lower face of the main body 4b is kept in contact with the upper portion 3f of the float body 3. In the illustrated example, the main body 4b is larger than the window hole 3s. The seal member 4 is mounted on the float body 3 in a state where the projection 4d is kept in contact with the base 3i and the window hole 3s is closed with the main body 4b. As illustrated in FIG. 1, a through hole 4e extends from the center of the main body 4b up to a projecting end of the projection 4d.

The extending portion 4c has a size that enables the extending portion 4c to be inserted into the reception space defined by the hook portion 3c and the pair of support portions 3y from the window hole 3s side. The width of the extending portion 4c in the direction perpendicular to the extending direction thereof is substantially equal to the distance between the support portions 3y. The extending portion 4c includes a dividing groove 4f which extends from a projecting end thereof toward the main body 4b. The extending portion 4c is inserted in the reception space with the intermediate support portion 3z inserted in the dividing groove 4f. Accordingly, the extending portion 4c inserted under the hook portion 3c is constantly held at a predetermined position.

In the present embodiment, the combining portion 4a includes the projection pieces 4g which project downward from the main body 4b and include the engagement projection 4h which is formed on the projecting end of the projection piece 4g.

In the illustrated example, in the seal member 4, the upper end of the projection piece 4g is integrated with the main body 4b at a position between the projection 4d and the extending portion 4c. The projection piece 4g has a plate-like shape including faces extending along the groove width of the groove-like recess 3g. The engagement projection 4h is formed on the projection piece 4g at the side facing the extending portion 4c. The engagement projection 4h includes inclined surfaces on the upper and lower sides across a top thereof. The inclined surfaces gradually reduce an up-down dimension of the engagement projection 4h toward the top.

In the present embodiment, the projection piece 4g can be inserted into the engagement hole 3w formed on the float body 3 by elastic deformation of the seal member 4. In the illustrated example, the maximum dimension of the projection piece 4g in the horizontal direction at a position where the engagement projection 4h is formed is slightly larger than the distance between the hole edge 3v of the additional hole portion 3u of the window hole 3s and the base 3i. Further, at the reception end position where the projection piece 4g has been completely inserted in the engagement hole 3w as described above, the hole edge 3v of the additional hole portion 3u as the hole edge of the engagement hole 3w is hooked on the engagement projection 4h of the projection piece 4g with up-and-down movements of the seal member 4 allowed in the certain range by elastic return of the seal member 4.

That is, the seal member 4 having rubber-like elasticity can be easily and appropriately mounted on the upper portion 3f of the float body 3 by combining the projection piece 4g as the combining portion 4a with the engagement hole 3w as the combined portion 3b while inserting the extending portion 4c under the hook portion 3c.

Figure 3:
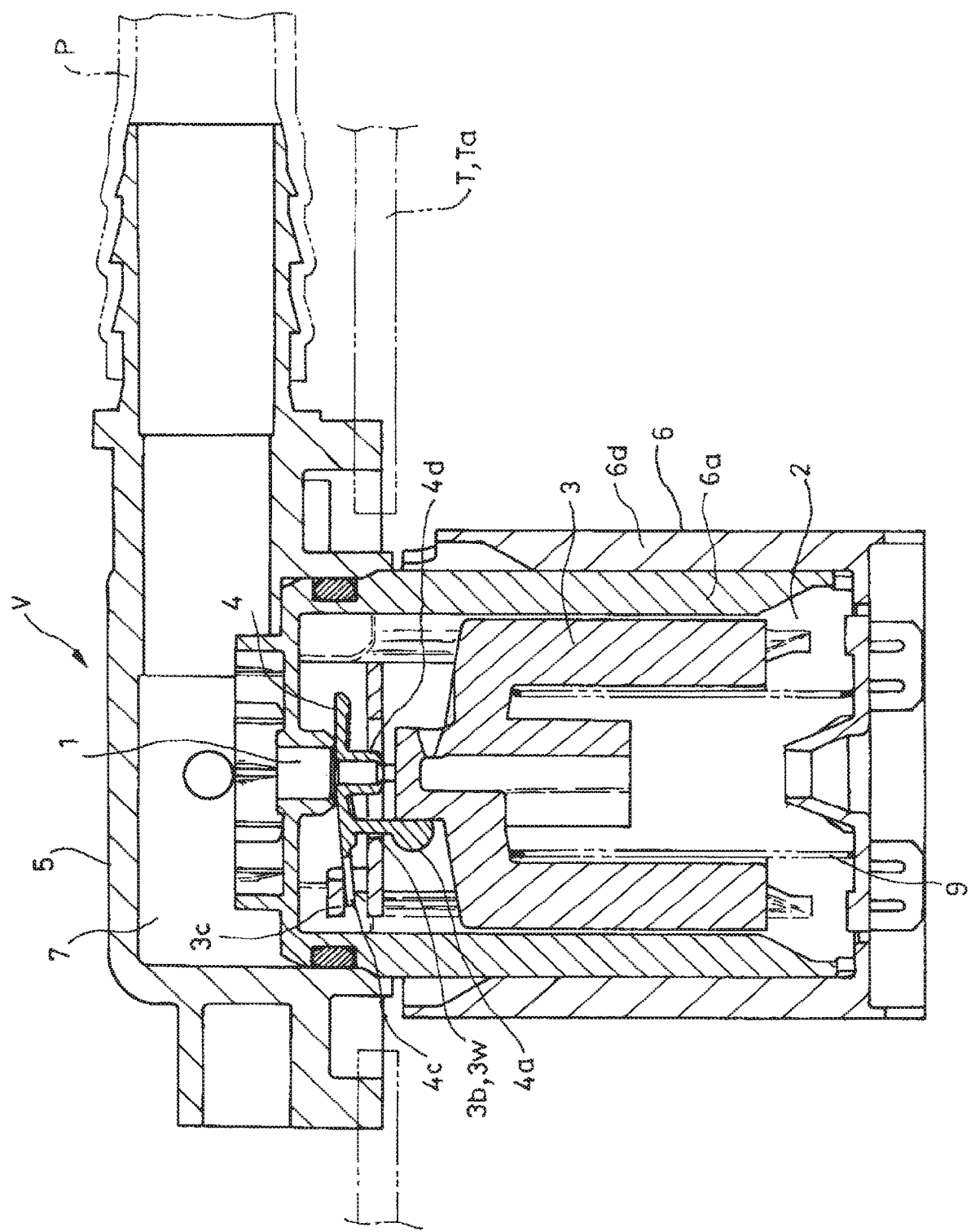
FIG. 3 is a sectional view of the valve apparatus illustrating a state at the instant when a float body becomes movable downward from a state of FIG. 2.
Figure 4:
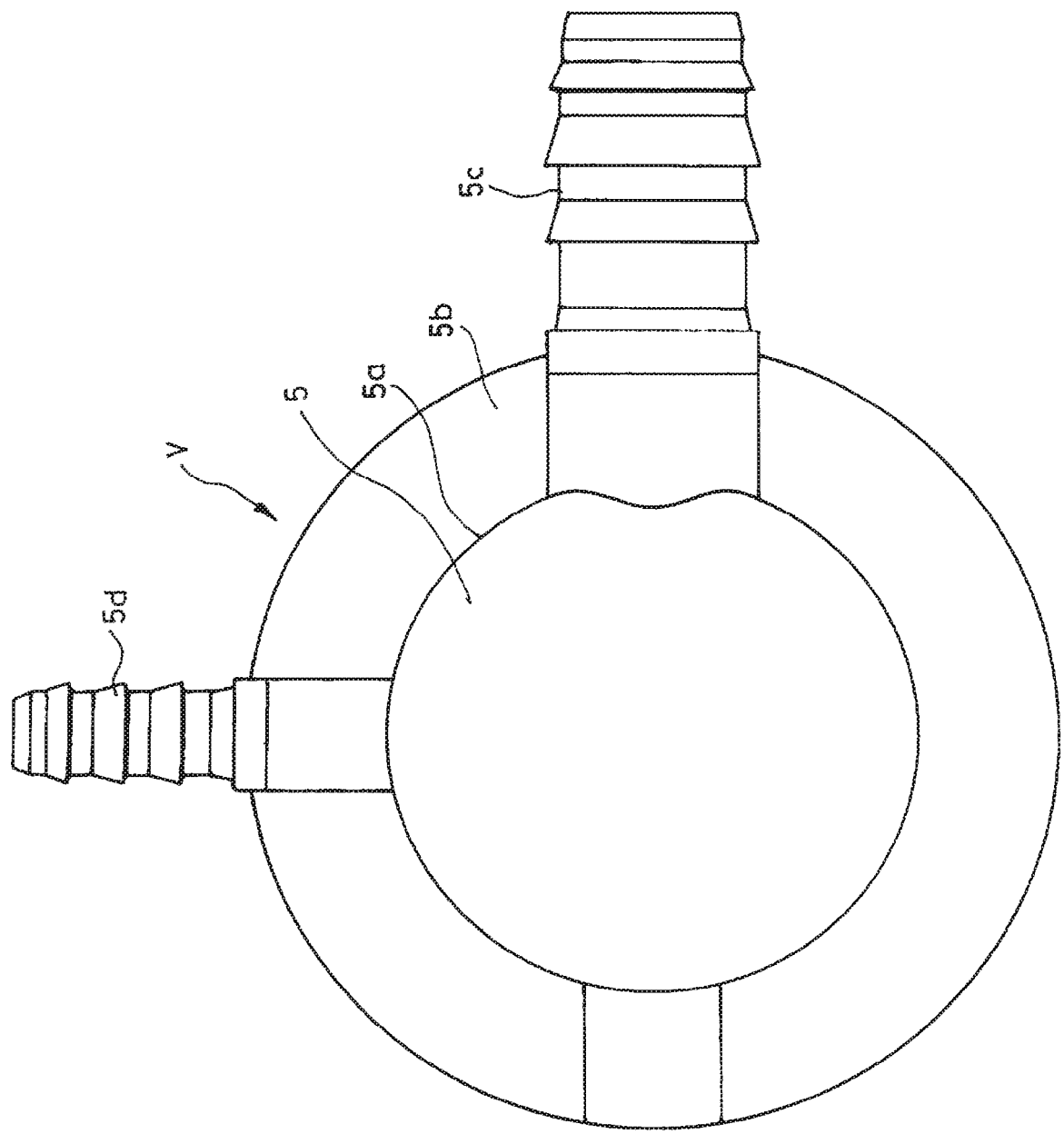
FIG. 4 is a plan view of the valve apparatus.
Figure 5:
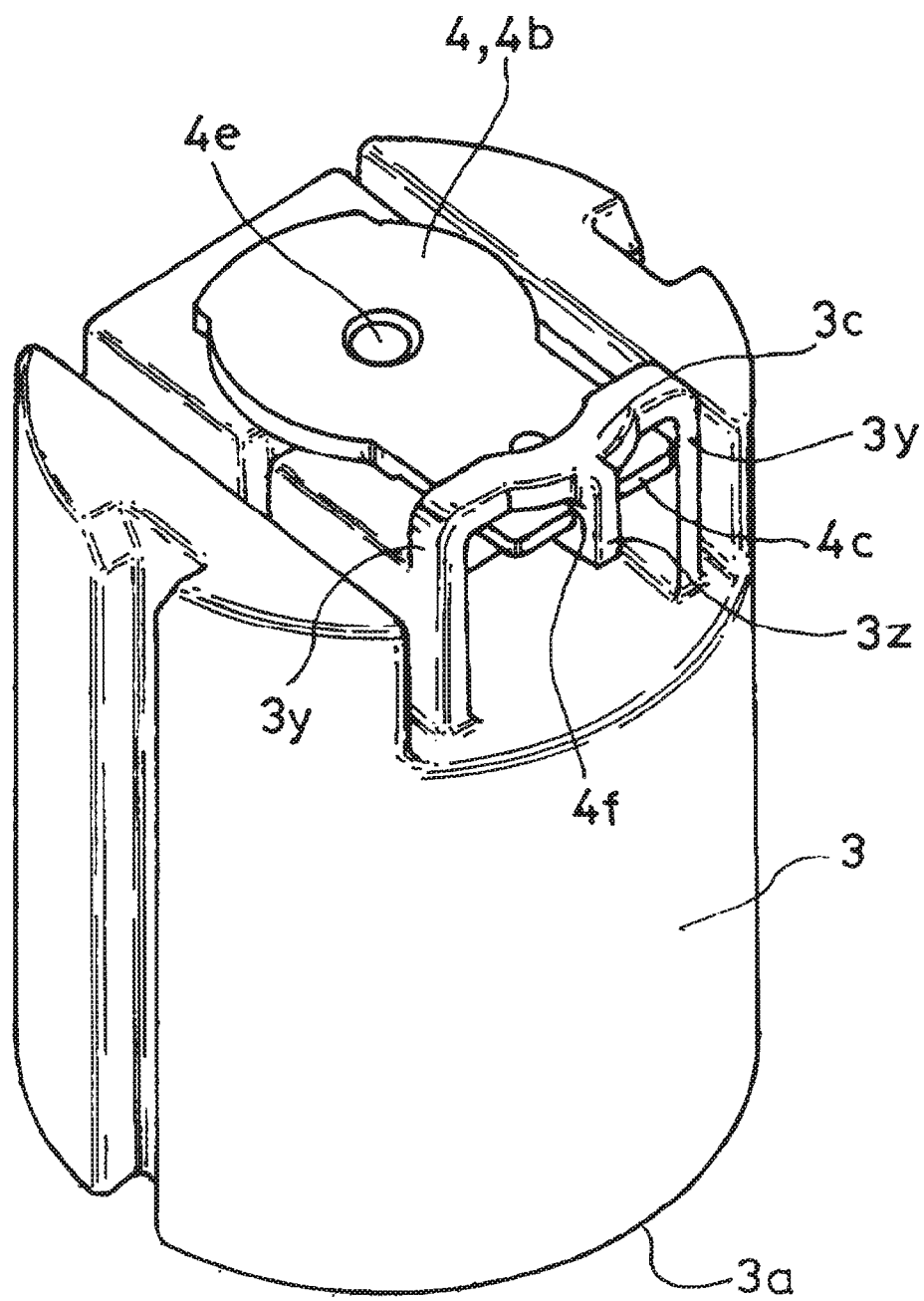
FIG. 5 is a perspective view of the float body included in the valve apparatus.
Figure 6:
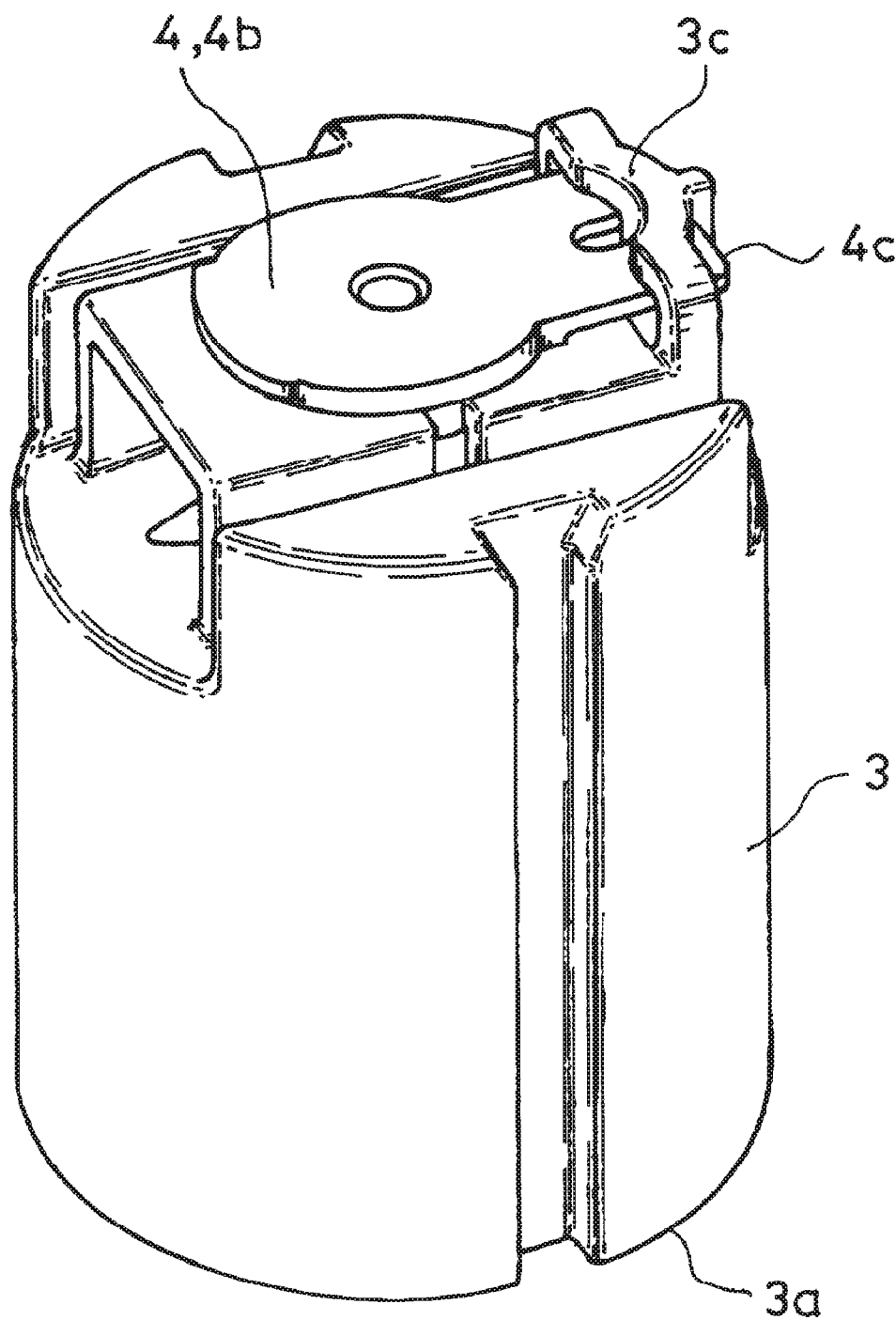
FIG. 6 is a perspective view of the float body included in the valve apparatus.

When the float body 3 is raised to the maximum raised position by a fuel (not illustrated) flowing into the valve chamber 2, the seal member 4 can close the valve port 1, thereby preventing the fuel from flowing out through the valve port 1 (FIG. 2, a valve-closed state). When the fuel flows out of the valve chamber 2 after closing the valve port 1, the float body 3 becomes movable downward by its own weight. However, when the pressure inside the fuel tank Tb is high, a phenomenon in which the seal member 4 is stuck to the valve port 1 occurs. In the present embodiment, the seal member 4 is combined with the float body 3 movably up and down in the certain range, and the extending portion 4c is located under the hook portion 3c. Thus, at this time, the float body 3 can cause a force for pulling the seal member 4 off the valve port 1 to effectively act on the seal member 4 through the hook portion 3c from the side of the extending portion 4c which is located at the outer side relative to the combining portion 4a and has a certain length (FIG. 3). Accordingly, even when such a phenomenon occurs, it is possible to release the intimate contact between the seal member 4 and the valve port 1 to promptly lower the float body 3, thereby ensuring a ventilation state between the inside and the outside of the fuel tank Tb.

The seal member 4 is mounted on the float body 3 with the projection 4d kept in contact with the base 3i. Thus, the orientation of the upper face of the seal member 4 is changeable around the projection 4d in a certain range. Thus, even when the float body 3 is raised in a slightly tilted manner, the seal member 4 can perform correction in response to the tilt to close the valve port 1 with no gap therebetween at the maximum raised position.

It is needless to say that the present invention is not limited to the embodiment described above, and includes all embodiments that can achieve the object of the present invention.

The present application is based on and claims priority of Japanese Patent Application No. 2019-187102 filed on Oct. 10, 2019.

REFERENCE SIGNS LIST

T fuel tank
1 valve port
2 valve chamber
3 float body
3b combined portion
3c hook portion
3f upper portion
4 seal member
4a combining portion
4b main body
4c extending portion

What is claimed is:

1. A fuel tank valve apparatus, comprising:
    a valve port configured to allow inside and outside of a fuel tank to communicate with each other;
    a valve chamber formed under the valve port;
    a float body disposed movably up and down inside the valve chamber; and
    a seal member having elasticity with respect to the valve port, and mounted on an upper portion of the float body to move in an up-and-down direction freely in a predetermined range, wherein
    the seal member includes:
        a main body configured to close the valve port and having a through hole,
        an extending portion laterally extending from the main body,
        a projecting piece projecting downward between the main body and the extending portion, and
        an engaging projection projecting laterally from a side of the projection piece, and the float body includes:
    a hook portion attached to the float body to be located above the extending portion, and
    an engagement hole formed on the float body to receive the projecting piece and the engaging projection of the seal member and having a hole edge hooked with the engaging projection of the projection piece so that the seal member is moved in the up-and-down direction in the predetermined range.

2. The fuel tank valve apparatus according to claim 1, wherein the hook portion is laid between a pair of support portions projecting upward from the upper portion of the float body.

3. The fuel tank valve apparatus according to claim 2, further comprising a positioning portion formed between the pair of support portions and inserted into a dividing groove of the seal member, the dividing groove extending from a projecting end of the extending portion of the seal member toward the main body.

4. The fuel tank valve apparatus according to claim 1, wherein the seal member includes a projection formed on a center of a lower face of the main body and mounted on an upper portion of the float body.

5. The fuel tank valve apparatus according to claim 1, wherein the float body further includes a base projecting upwardly from the float body, and a top plate disposed above the base and having the engagement hole immediately above the base so that the projecting piece and the engaging projection enter the engagement hole.

6. The fuel tank valve apparatus according to claim 5, wherein the hook portion is located at one side of the engagement hole, and extends upwardly from the top plate, the extending portion being interposed between the hook portion and the top plate.

* * * * *